2,988,571
DINITROPHENOXYETHANOL PROCESS

Kenneth W. MacFie and Robert A. Mosher, Seymour, Ind., assignors to Standard Oil Company, Chicago, Ill., a corporation of Indiana
No Drawing. Filed Nov. 27, 1957, Ser. No. 699,423
6 Claims. (Cl. 260—613)

This invention relates to the preparation of dinitrophenoxyethanol and particularly to a process for preparing dinitrophenoxyethanol with little or no production of the bis(nitrophenoxy)ethane material.

2,4-dinitrophenoxyethanol (also known as 2,4-dinitrophenyl-β-hydroxy ethyl ether) is an excellent plasticizer for cellulose acetate. An appreciable demand for this material has arisen for the purposes of plasticizing cellulose acetate. The classic method of preparing this material involves the reaction of dinitrochlorobenzene and ethylene glycol in the presence of aqueous sodium hydroxide solution to produce a mixture of the desired product dinitrophenoxyethanol and a by-product bis(dinitrophenoxy)ethane. The classic procedure results in the formation of large amounts of the bis-compound; ordinarily between about 30 and 50 percent of the reaction product is the bis-compound.

This invention is directed to the production of nitrophenoxy-alkanol as substantially the only "phenoxy" product, i.e., on the order of 90 percent or more of the "phenoxy" product. Other objects will become apparent in the course of the detailed description.

The reaction involved in the instant invention is illustrated by the equation set out below for the preparation of 2,4-dinitrophenoxyethanol and 1,2-bis-(2,4-dinitrophenoxy-ethanol and 1,2-bis-(2,4-dinitrophenoxy)ethane.

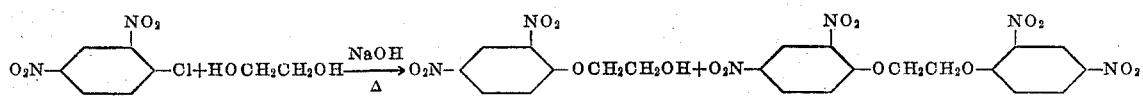

In the process of the instant invention nitrohalobenzene is reacted with glycol. The nitrohalobenzene may contain 1, 2 or 3 nitro groups attached to the benzene nucleus. The halo group may be selected from chloro, bromo, iodo or fluoro. For example, the nitrohalobenzene may be dinitrochlorobenzene, nitroiodobenzene, 2,4,6-trinitrochlorobenzene, 2,4 - dinitrobromobenzene, etc. The glycol may be a simple glycol such as, ethylene glycol or propylene glycol or a glycol ether such as, diethylene glycol, dipropylene glycol or triethylene glycol. The glycol must have a molecular weight of not more than about 200. The material sold commercially as polyglycol 200 is suitable for the purposes of the invention.

The glycol and the nitrohalobenzene are intimately contacted in a mole ratio of at least 3. In general, the mole ratio of glycol to nitrohalobenzene used is between about 4 and 6. A higher ratio of glycol to nitrohalobenzene favors the production of the desired nitrophenoxyalkanol.

At least 1 mole of solid alkali metal hydroxide is introduced per mole of nitrohalobenzene charged to the reaction zone. The yield of "phenoxy" product is increased by using an excess of alkali metal hydroxide, so it is preferred to operate using a mole ratio in excess of 1, for example from 1.1 to 1.3. The alkali metal hydroxide may be either sodium hydroxide, potassium hydroxide or lithium hydroxide. The solid hydroxide may contain some absorbed water but the anhydrous state is preferred.

The reaction may be carried out at temperatures between about 30° C. and 130° C. Although the higher temperatures increase the rate of reaction, excessively high temperatures cause degradation of the materials. Usually the reaction is carried out at temperatures between 70° C. and 90° C.

In the process of the invention all of the glycol is charged to a reaction zone, suitably, into an autoclave provided with a propeller stirrer, and is brought up to about the desired reaction temperature. The nitrohalobenzene is brought to about the reaction temperature. Preferably the particular nitrohalobenzene is introduced into the reaction zone in the liquid state. The materials in the reaction zone are intimately contacted in order to obtain a rapid reaction rate. The liquid nitrohalobenzene is introduced incrementally into the reaction vessel containing the glycol. The solid alkali metal hydroxide is also added incrementally to the reaction zone; preferably these increments are added simultaneously with the addition of the nitrohalobenzene increment. The increments of solid alkali metal hydroxide are controlled to provide an excess of alkali metal hydroxide over the nitrohalobenzene present after that incremental addition. The introduction may be 2, 3, 4 or a greater number of increments. When the nitrohalobenzene is added in a small number of increments, the alkali metal hydroxide is added, either continuously, or in a number of increments, at a rate such that the exothermic heat of reaction is removed rapidly enough to maintain the reaction zone at the desired temperature.

Each increment of reactant nitrohalobenzene and solid alkali metal hydroxide is permitted to react substantially completely with the glycol before the next incremental addition of reactant nitrohalobenzene and solid alkali metal hydroxide. The overall yield and the yield of the desired nitrophenoxyethanol is improved by operating with a large number of small increments and particularly with substantially continuous addition of the nitrohalobenzene and solid alkali metal hydroxide. When adding the reactant substantially continuously the addition is carried out at a rate such that substantially all the nitrohalobenzene is reacted immediately, i.e., substantially no unreacted nitrohalobenzene is present in the reaction zone at any time. Furthermore, the rate of addition of increments is determined by the ability to maintain the reaction zone at the particularly determined reaction temperature. The reaction is exothermic and it may be necessary to have cooling means present in the reaction zone to keep the zone at the particular reaction temperature.

After the addition of the last increment of nitrohalobenzene and solid alkali metal hydroxide the materials in the reaction zone are intimately contacted for a period of time sufficient to permit the completion of the reaction of the nitrohalobenzene. When the reaction is complete liquid water is added to the reaction zone. The liquid water is added in an amount sufficient to precipitate essentially all of the "phenoxy" reaction product. The unreacted glycol and water soluble by-products such as, sodium chloride and sodium dinitrophenate are dissolved and form an aqueous phase. The solid "phenoxy" reaction product is separated from the aqueous phase, for example, by filtration. The solid "phenoxy" product is preferably, water washed to leach out water soluble materials present therein, before being dried to remove adsorbed water.

Tests 1–3

A 1 liter glass beaker was the reaction vessel. The glass beaker was positioned within a stainless steel beaker filled with water as a heating bath. The glass beaker was provided with a propeller stirrer and a thermometer. Separatory funnels were positioned above the glass beaker as the source of the solid anhydrous sodium hydroxide or solution and the dinitrochlorobenzene. The dinitrochlorobenzene was maintained liquid by heat from an infra-red lamp suspended near the separatory funnel. In these tests the ethylene glycol was introduced into the glass beaker and brought to a temperature of about 80° C. The dinitrochlorobenzene and sodium hydroxide were added substantially continuously at a rate such that the contents of the reactor were maintained at the desired reaction temperature of 85–90° C. The total addition time was in the region of 60 minutes. In order to insure the complete reaction a reactor was agitated at about 85° C. for an hour after the final addition of dinitrochlorobenzene and sodium hydroxide. At the end of this time 500 ml. of liquid water was added to the reactor with stirring and the reactor contents cooled to about 50° C. The solid precipitate was removed by filtration. The solid on the filter was washed five times with 80 ml. of liquid water each time and then dried in an oven to moisture content of not more than 0.5 weight percent. In all the tests 200 grams of 2,4-dinitrochlorobenzene and 47 grams of sodium hydroxide as solid or in the form of a 50 percent solution in water were used. The overall mole ratio of sodium hydroxide to dinitrochlorobenzene was 1.17 in Tests 1 and 3 and the overall mole ratio of glycol to dinitrochlorobenzene was 3.9.

*Test 1.*—In this test anhydrous sodium hydroxide was added to the reactor in a manner such that an excess of hydroxide over the theoretical was present in the reactor through the reaction. The overall yield of phenoxy material was 86.5 percent based on dinitrochlorobenzene charged and the phenoxy material contained 8 percent of the undesired bis(dinitrophenoxy)ethane material.

*Test 2.*—In this test the amount of anhydrous sodium hydroxide added was controlled so that at all times a slight excess of dinitrochlorobenzene was present over the theoretical requirement of sodium hydroxide. The overall yield of phenoxy material was 80.3 percent and the phenoxy material contained 23 percent of the undesired bis(dinitrophenoxy)ethane material. Tests 1 and 2 show that the presence of an excess of sodium hydroxide not only clearly involves the quality of the "phenoxy" product but also significantly improves the overall yield.

*Test 3.*—In this test a 50 percent aqueous sodium hydroxide solution was used as the source of sodium hydroxide. The solution and the dinitrochlorobenzene were added essentially continuously to the reactor in an amount such that an excess of the sodium hydroxide was always present. The overall yield of phenoxy material from the test was 80.0 percent and the phenoxy material contained 24 percent of the undesired bis(dinitrophenoxy)ethane material. Tests 1 and 3 show the beneficial effects of operating with anhydrous solid sodium hydroxide both with respect to overall yield and particularly with respect to quality of phenoxy material.

Thus having described the invention, what is claimed is:

1. A process which comprises introducing a glycol having a molecular weight of not more than about 200 into a reaction zone maintained at a temperature between about 30° C. and 130° C., after the introduction of said glycol, introducing incrementally liquid nitrohalobenzene and solid substantially anhydrous alkali metal hydroxide into said reaction zone under conditions providing intimate contacting of the materials therein, at a rate such that each increment is substantially reacted before the introduction of the next increment, the external mole ratio of said glycol to said nitrohalobenzene being at least 3 and the mole ratio of said nitrohalobenzene to said alkali metal hydroxide being between about 1.1 and 1.3, introducing liquid water into said zone in an amount sufficient to precipitate substantially all of the insoluble solid reaction product and separating a solid reaction product, comprising nitrophenoxyalkanol as substantially the only "phenoxy" product from an aqueous phase.

2. The process of claim 1 wherein said glycol is ethylene glycol.

3. The process of claim 1 wherein said nitrohalobenzene is dinitrochlorobenzene.

4. The process of claim 1 wherein said temperature is between about 70° C. and 90° C.

5. The process of claim 1 wherein said nitrohalobenzene and said hydroxide are added continuously to said zone.

6. A process which comprises introducing ethylene glycol into a reaction zone provided with agitation means, maintaining said zone at a temperature between about 70° C. and 90° C., substantially continuously and simultaneously adding dinitrochlorobenzene and solid substantially anhydrous alkali metal hydroxide, to said zone, the mole ratio of dinitrochlorobenzene to alkali metal hydroxide being between 1.1 and 1.3, the external mole ratio of glycol to dinitrochlorobenzene being about 4, said addition being carried out at a rate such that essentially no unreacted dinitrochlorobenzene is present at any time, maintaining said zone at said reaction temperature for a time after completion of the introduction of said dinitrochlorobenzene and said hydroxide to essentially complete the reaction between said glycol and said dinitrochlorobenzene, adding liquid water to said zone to form an aqueous phase and a solid "phenoxy" reaction product phase, separating said phases and water washing said solid phase to obtain solid "phenoxy" reaction product consisting of substantially only dinitrophenoxy ethanol.

References Cited in the file of this patent

Fairbourne, et al.: Chem. Abstracts, vol. 16, page 1072 (1922), J. Chem. Soc., 119, pages 2076–8 (1921).